United States Patent [19]
Matsushima

[11] 3,735,809
[45] May 29, 1973

[54] FLUID DISTRIBUTION DEVICE

[75] Inventor: Katsuaki Matsushima, Aichi-ken, Toyota City, Japan

[73] Assignee: Toyota Jidosha Kogyo Kabushiki Kaisha, Toyota City, Aichi-ken, Japan

[22] Filed: Sept. 7, 1971

[21] Appl. No.: 178,215

[30] Foreign Application Priority Data

Sept. 9, 1970  Japan..............................45/79007

[52] U.S. Cl.....................165/103, 98/41 R, 137/499
[51] Int. Cl. ..............................................F28f 27/02
[58] Field of Search.......................98/41 R; 165/34, 165/36, 103, 35; 137/499, 512.1, 512.2, 610

[56] References Cited

UNITED STATES PATENTS

| | | | |
|---|---|---|---|
| 2,205,117 | 6/1940 | Chambers | 165/35 X |
| 2,246,338 | 6/1941 | Ashley | 98/41 R |
| 2,933,100 | 4/1960 | Waterfill | 137/499 |
| 3,433,295 | 3/1969 | Avery | 165/35 |
| 3,650,318 | 3/1972 | Avery | 165/35 X |

Primary Examiner—Manuel A. Antonakas
Attorney—Stevens, Davis, Miller & Mosher

[57] ABSTRACT

A heat exchanger for an air flow, comprising; a duct with a hump; a heat transfer matrix mounted on the duct within the hump in a spaced manner to make a free air flow passageway, a damper plate pivotally mounted on the matrix, a first plate having a plurality of first apertures and mounted on the duct, a second plate with a plurality of second apertures, a device for linking the second plate with the damper plate, and apparatus connected to the damper plate for holding the damper plate in a first or second position and moving the damper plate therebetween.

The damper plate closes the free air flow passageway when the damper plate is in a first position, thereby forcing air to flow through the matrix, said damper plate covers a portion of the matrix when the damper plate is in a second position, thereby allowing air flow through the free air flow passageway, and an uppermost periphery of the first plate is contiguous to a lower periphery of the damper plate when the damper plate is in the second position.

9 Claims, 10 Drawing Figures

FLUID DISTRIBUTION DEVICE

This invention relates to a heat exchanger for a fluid, such as air, water, oil and the like, and more particularly it is concerned with a heat exchanger for a fluid which permits regulation of the ratio of fluid distribution.

Conventional devices of this type aim at controlling the temperature of the fluid, concentration of the fluid or humidity of the air by regulating the ratio of distribution of the fluid by actuating a switch or damper. Reference will hereinafter be made in this specification to devices aiming at controlling the temperature of air.

In one type of temperature control device known in the art, air is introduced through an inlet port 1 and distributed to a cold air passageway 2 and a passageway in which a heat source 4 is mounted by actuating a damper 5 pivotally supported by a shaft 20 as shown in FIG. 1, so as to thereby control changes in the temperature of air at an outlet port 3. This device is not capable of carrying out control of temperature continuously over a wide range because the damper 5 is not able to deflect air completely from the passage in which the heat source 4 is mounted.

In one modification of the device shown in FIG. 2, the damper 5a is sufficiently large in size to intercept the air completely so that the air may not be deflected to move toward the heat source when it is directed to the cold air passage. Thus, the modification shown in FIG. 2 represents an improvement in controlling temperature, but it has a disadvantage in that the damper 5a of large size requires a large space for installing the device, so that the device cannot be installed in limited spaces. The conventional air temperature control device described must meet two conflicting requirements which are hard to reconcile: the device requires a large space in which it is installed to effect temperature control satisfactorily; and the efficiency of temperature control is reduced if the device is installed in a small space.

This invention obviates the aforementioned disadvantage. The invention has as its object the provision of a heat exchanger for a fluid which can be installed in a small space and which can yet effect temperature control satisfactorily. The device of this invention is characterized by the provision of a movable shield plate and a fixed shield plate for closing a portion of a passageway which cannot be closed completely by a damper.

Additional objects as well as features and advantages of this invention will become evident from the description set forth hereinafter when considered in conjunction with the accompanying drawings, in which.

Figure 1:
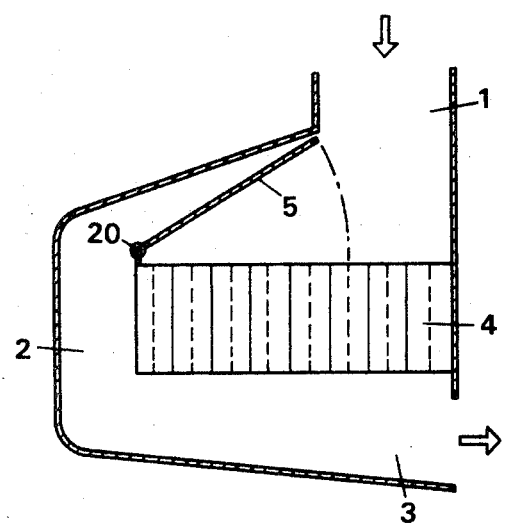
FIG. 1 and FIG. 2 are transverse sectional views of a conventional device.
Figure 2:
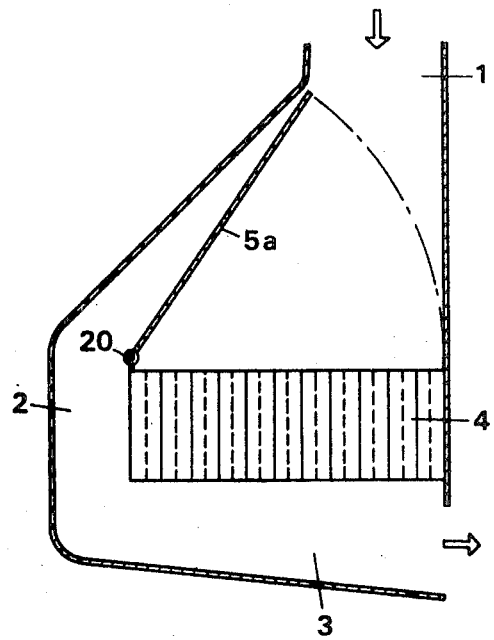
Figure 3:
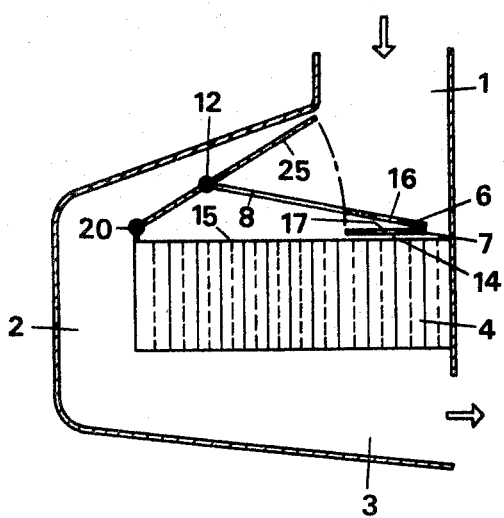
FIG. 3 and FIG. 4 are transverse sectional views of a first embodiment of this invention.

Preferred embodiments of this invention will be explained with reference to the accompanying drawings. In FIG. 3, 1 is an air inlet port, 3 an air outlet port, 2 a cold air passageway (one passageway) and 4 a heat transfer matrix or heat source (mounted in the other passageway). The air introduced into the device through the air inlet port 1 is distributed to one passageway or the cold air passage 2 and the other passageway having the heat source 4 mounted therein by a damper plate 25 pivotally supported by a shaft 20. The two streams of air passing through the two passageways are jointed together at the air outlet port 3.

The damper 25 alternately opens and closes the cold air passageway 2 and the passageway in which the heat source 4 is mounted, but it is unable to completely close the passageway in which the heat source 4 is mounted. According to this invention, there are provided a fixed shield plate 7 formed with a slit 17 and mounted in a portion 14 of the passageway having the heat source 4 which cannot be closed by the damper 25, and a movable shield plate 6 formed with a slit 16 and adapted to cooperate with the shield plate 7 to close the portion 14 when the damper 25 closes the passageway having the heat transfer matrix or heat source 4. The movable shield plate 6 is secured to the front ends of connecting rods 8 pivotally connected at rear ends thereof to the rear surface of the damper 25 on opposite sides of its central portion.

Figure 5:
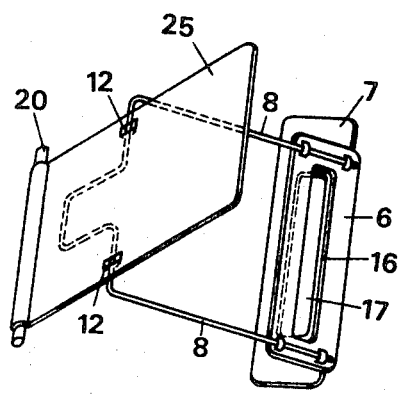
FIG. 5 is a perspective view of essential portions of the first embodiment shown in FIGS. 3 and 4.
Figure 6:
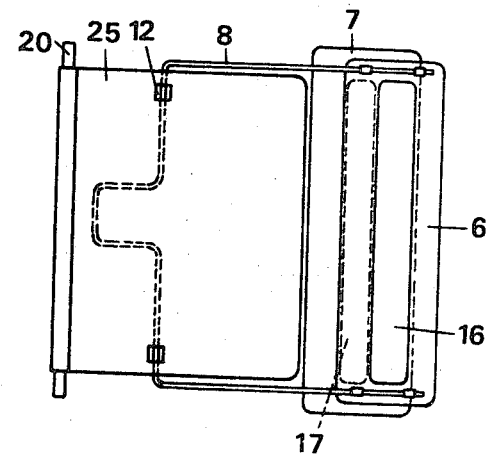
FIG. 6 is a plan view of FIG. 5.

FIGS. 5 and 6 show relative positions of the damper 25 and two shield plates 6 and 7. In FIG. 5, the passageway having the heat source 4 is shown as being opened by the damper 25, with the slits 16 and 17 of the two shield plates 6 and 7 respectively being open so as to permit air to pass therethrough. In FIG. 6, the passageway having the heat source 4 is shown as being closed by the damper 25, with the slits 16 and 17 of the shield plates 6 and 7 respectively being closed by the solid portions of the adjacent shield plates so that air cannot pass therethrough.

The connecting rods 8 are made of a material which is resilient enough to urge the movable shield plate 6 to move toward the fixed shield plate 7 into engagement with each other in order to maintain the two shield plates 6 and 7 in contact with each other at all times. When the damper 25 closes the cold air passage 2 as shown in FIG. 3, the slits 16 and 17 of the two shield plates 6 and 7 respectively are brought into alignment with each other, so that the air introduced through the air inlet port 1 into the device all passes through a portion 15 which is opened by the damper 25 and the portion 14 in which the slits 16 and 17 are disposed to move into the passageway having the heat source 4, so that the temperature of air at the air outlet port 3 is maximized.

Figure 4:
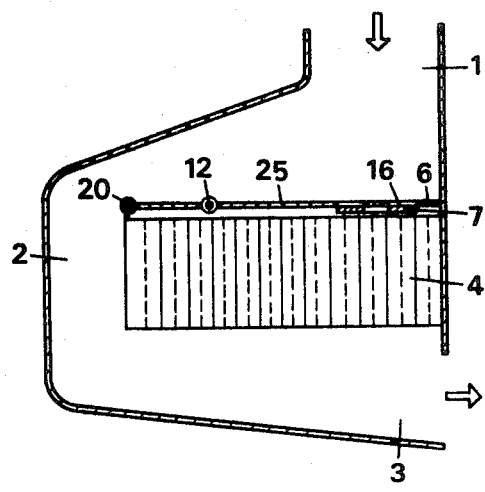

In FIG. 4, the damper 25 is shown as closing the passageway having the heat source 4 and the slits 16 and 17 as being brought out of alignment with each other to be closed by the solid portions of the adjacent shield plates, so that the air introduced through the air inlet port 1 into the device all passes through the cold air passageway 2 and the temperature of air at the air outlet port 3 is minimized.

If the damper 25 is brought to a position which is disposed intermediate between its position shown in FIG. 3 and its position shown in FIG. 4, the air introduced through the air inlet port 1 into the device will partly pass through the passageway having the heat source 4 and the rest of the air will pass through the cold air passageway 2 to be mixed at the air outlet port 3. This will result in the temperature of air at the air outlet port 3 being lower than the maximum temperature and higher than the minimum temperature. It will be appreciated that by adjusting the position of the damper it is possible to freely regulate the temperature of air at the air outlet port.

Figure 8:
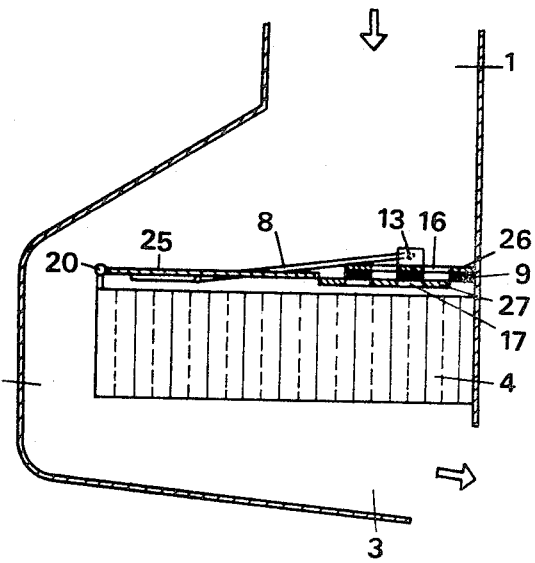
FIG. 7 and FIG. 8 are transverse sectional views of a second embodiment of this invention.
Figure 7:
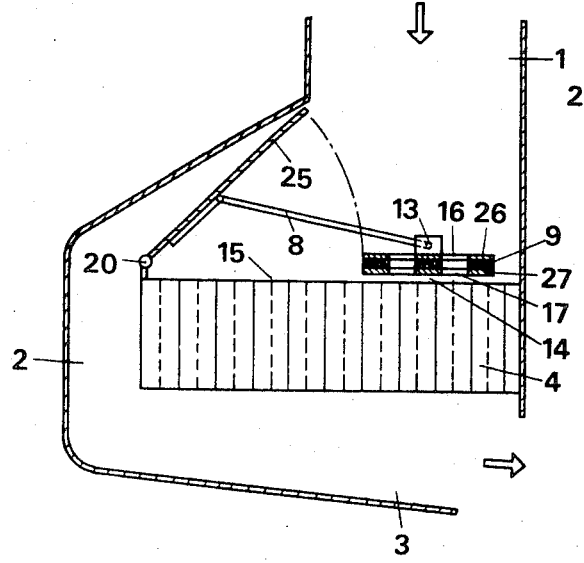
Figure 9:
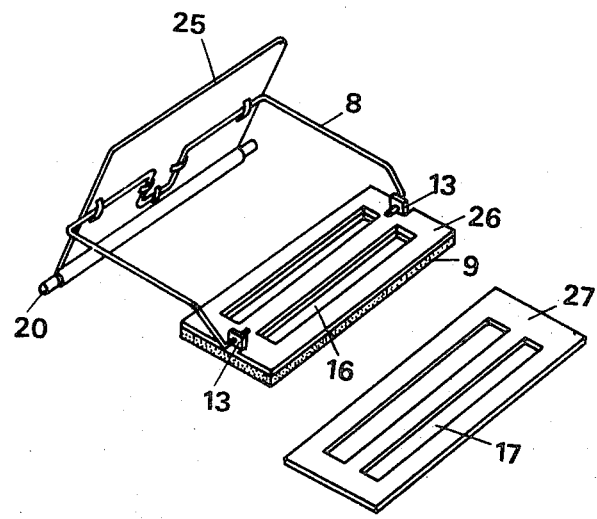
FIG. 9 is an exploded perspective view of essential portions of the second embodiment.

FIGS. 7 to 9 show a second embodiment of this invention. The embodiment shown comprises a modification of the movable shield plate 6 which can be modified in many other ways. As shown, a shield plate 26 is supported by the connecting rods 8, 8 at two positions designated 13 and 13. The connecting rods 8, 8 are designed such that the angle formed between the connecting rods 8, and the damper 25, the shield plate 26 and a fixed shield plate 27 is greater when the connecting rods 8 are not assembled than when they are assembled. More specifically, the connecting rods 8 are designed such that, besides connecting the damper 25 to the shield plate 26, the connecting rods 8 exert a resilient force on the shield plate 26 so as to bring the shield plate 26 into pressing engagement with the shield plate 27 when assembled. The movable shield plate 26 is supported by the connecting rods 8, 8 for pivotal motion about a line connecting the two points 13 and 13. This arrangement is effective to preclude the production of noises by the dancing movements of the movable shield plate 26 when vibrations occur.

A packing 9 is provided on the movable shield plate 26 such that the packing 9 may be disposed between the two shield plates 26 and 27. The provision of the packing 9 has the effect of preventing air leakage or noise production due to inadequate contact between them when the portion 14 is open because of misalignment of the slits 16 and 17.

The passageway having the heat source 4 is shown as being opened in FIG. 7 and closed in FIG. 8. The shield plate 26 moves parallel to the shield plate 27 at all times.

Figure 10:
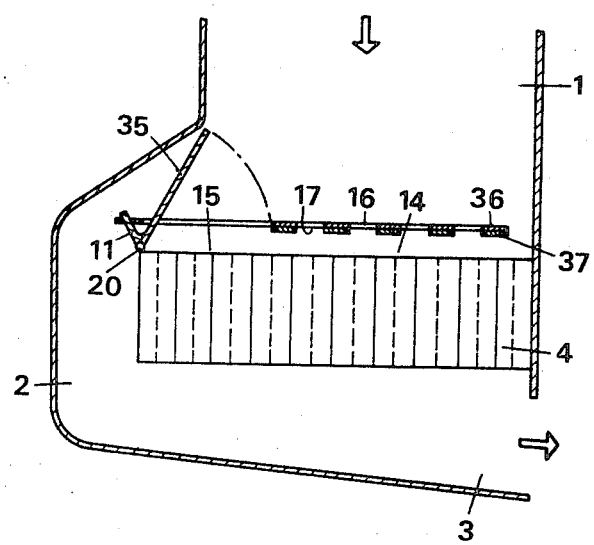
FIG. 10 is a transverse sectional view of a third embodiment of this invention.

In a third embodiment of this invention, an arm 11 is provided in a damper 35 as shown in FIG. 10 so that a movable shield plate 36 may move parallel to a fixed shield plate 37 in response to the movement of the damper 35. The shield plates 36 and 37 each are formed with a number of slits.

From the foregoing description, it will be appreciated that the device according to this invention does not require a large space in which it is installed and yet can continuously control temperature from the maximum level to the minimum level by virtue of the provision of the movable shield plate and fixed shield plate for opening and closing the air flow passageways in cooperation with the damper.

It is to be understood that, while the description set forth in this statement with regard to the object, construction and effect of this invention refers to the control of air temperature, the invention can have application in other matters without departing from the spirit and scope of the claims appended hereto.

What is claimed is:

1. A heat exchanger for an air flow, comprising: a duct including a hump and a base portion, a hump top of said hump opposed to and facing said base portion; a heat transfer matrix mounted on said base portion, said hump enclosing, in a spaced manner, said matrix thereby forming a free air flow passageway therebetween, said matrix allowing air to flow therethrough; a damper plate pivotally mounted on said matrix upstream thereof, said damper plate closing said free air flow passageway when said damper plate is in a first position thereby forcing air to flow through said matrix, said damper plate covering a portion of said matrix when said damper plate is in a second position thereby allowing air to flow through said free air flow passageway; a first plate mounted within said duct and facing an upstream portion of said matrix, a periphery of said first plate on the hump top side being contiguous to a periphery of said damper plate on the base portion side when said damper plate is in said second position, a periphery of said first plate on the base portion side facing, in a spaced manner, said base portion, said first plate having at least one first aperture, the distance between said first plate periphery on the base portion side and a periphery of said first aperture on the base portion side which is near said first plate periphery on the base portion side being substantially the same as the distance between said first plate periphery on the base portion side and said base portion; a second plate having at least one second aperture and being substantially the same in size and shape as said first plate, said second aperture being substantially the same in location within said second plate and in size and shape as said first aperture, said second plate being so constructed that a land contiguous to said second aperture and on the hump top side of said second aperture closes said first aperture corresponding to said second aperture when said second plate is so positioned that a periphery of said second plate on the base portion side touches said base portion; means for linking said second plate with said damper plate, said second plate substantially overlapping said first plate when said first plate is in said first position, said second plate periphery on the base portion side touching said base portion when said damper plate is in said second position; and means connected to said damper plate for holding said damper plate selectively in said first or second position and moving said damper plate therebetween.

2. A heat exchanger as claimed in claim 1 wherein said linking means comprises two bars each securely connected at one end thereof with said second plate to be even therewith and each pivotally connected at the other end thereof with said damper plate.

3. A heat exchanger as claimed in claim 1 wherein said linking means comprises two bars each securely connected at one end thereof with said second plate to be even therewith and each pivotally connected at the other end thereof with said damper plate; and means connected to said damper plate and said bars for always forcing said second plate towards said first plate.

4. A heat exchanger as claimed in claim 3 wherein said forcing means comprises a torsion bar spring.

5. A heat exchanger as claimed in claim 1 wherein said linking means comprises two bars each pivotally connected at one end thereof with said second plate and each pivotally connected at the other end thereof with said damper plate; and means connected to said damper plate and said bars for always forcing said second plate toward said first plate.

6. A heat exchanger as claimed in claim 5 wherein said forcing means comprises a torsion bar spring.

7. A heat exchanger as claimed in claim 3 wherein said second plate is lined at a first plate side thereof with a sealing lining.

8. A heat exchanger as claimed in claim 5 wherein said second plate is lined at a first plate side thereof with a sealing lining.

9. A heat exchanger as claimed in claim 1 wherein said linking means comprises two arms each securely connected at one end thereof with said damper plate with a certain angle therebetween in the vicinity of a connection point of said damper plate with said matrix; and two bars each securely connected at one end thereof with said second plate to be even therewith and each pivotally connected at the other end thereof with the other end of each of said arms respectively.

* * * * *